United States Patent
Noddin

[15] 3,651,795
[45] Mar. 28, 1972

[54] MAGNETO EXCITED CONDENSER DISCHARGE IGNITION SYSTEM

[72] Inventor: Ray C. Noddin, Chicopee, Mass.

[73] Assignee: Eltra Corporation, Toledo, Ohio

[22] Filed: July 6, 1970

[21] Appl. No.: 52,429

[52] U.S. Cl. ....................................123/149 A, 123/149 C
[51] Int. Cl. .............................................................F02p 1/00
[58] Field of Search ........................123/148 E, 149 R, 149 D

[56] References Cited

UNITED STATES PATENTS

| | | | |
|---|---|---|---|
| 3,358,665 | 12/1967 | Carmichael et al. | 123/148 E |
| 3,495,579 | 2/1970 | Davalillo | 123/149 |
| 3,465,739 | 7/1969 | Burson | 123/148 E X |
| 3,464,397 | 7/1969 | Burson | 123/148 E |
| 3,490,426 | 1/1970 | Farr | 123/148 E X |
| 3,524,438 | 8/1970 | Janisch | 123/148 E |

Primary Examiner—Laurence M. Goodridge
Attorney—D. Henry Stoltenberg

[57] ABSTRACT

A dynamoelectric generating device for internal combustion engines combining a breakerless ignition system of a condenser discharge type with an alternator for generating electrical power wherein the energizing and timing coils for the ignition system are mounted on a stator with the power generating coils, both being excited by a rotating permanent magnet structure driven by the engine. An automatic spark advance is provided actuated at a predetermined engine speed.

2 Claims, 4 Drawing Figures

INVENTOR.
RAY C. NODDIN
BY
D. Henry Stoltenberg
ATTORNEY

MAGNETO EXCITED CONDENSER DISCHARGE IGNITION SYSTEM

The combining of a breakerless ignition system of the condenser discharge type using solid state components with a power alternator for power circuits in a vehicle has long been sought as a suitable goal for commercial exploitation. The present invention provides such a combination in a form wherein a recovery period for the solid state components of the ignition circuit is attained with low cost and reliability. An automatic advance for ignition timing at a predetermined speed of the engine is also attained without complicated structures being used.

It is therefore a principal object of this invention to provide a breakerless ignition system of the condenser discharge type combined with a power alternator wherein a high efficiency and reliability of both elements is attained.

It is a further object of this invention to provide a breakerless ignition system of the condenser discharge type energized and triggered by a magneto, which utilizes solid state components and which has an automatic spark advance at a predetermined speed of rotation of the engine.

Other objects and advantages of this invention relating to the arrangement, operation and function of the related elements of the structure, to various details of construction, to combinations of parts and to economics of manufacture will be apparent to those skilled in the art upon consideration of the following description and appended claims, reference being had to the accompanying drawings forming a part of this specification wherein like reference characters designate corresponding parts in the several views.

Figure 1:
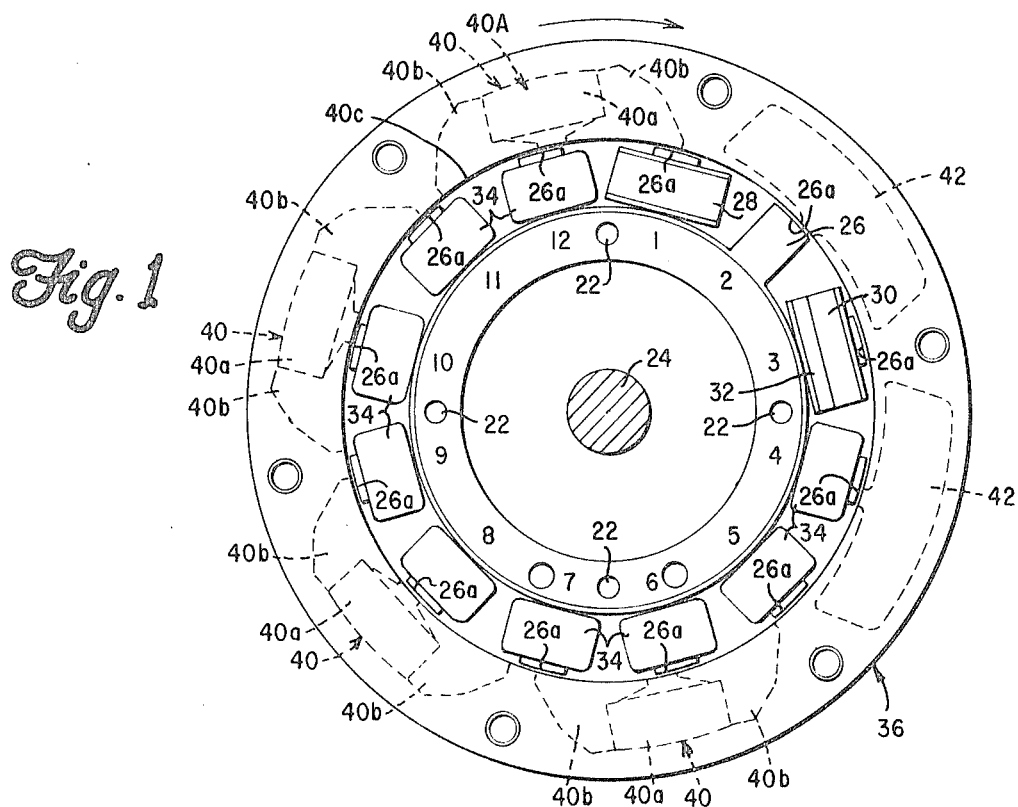
FIG. 1 is a top plan view of an alternator to which the invention has been applied.

Referring to the drawings particularly to FIG. 1, a fixed circular stator element 20 is shown which is attached to an engine (not shown) by bolts 22. The engine may be single cylinder, two cycle type, or may be of the multi-cylinder type used in connection with various devices such as boats, tractors and the like. The engine is provided with a rotatable drive shaft 24 concentric with the stator 20, being provided with suitable bearings in the conventional manner.

The stator 20 is provided with outwardly projecting poles 26 which are spaced in equidistant relation about its outer circumference. In the system shown, 12 poles are provided, although more or less may be utilized in design variations. The ends 26a of the poles are curved and concentric with the shaft 24. As is conventional, the stator is laminated to reduce losses due to eddy currents.

For convenience in description, the poles have been numbered 1–12, being spaced 30° apart about the circumference of the stator as shown in FIG. 1. Pole No. 1 has mounted on it a charging coil 28, while pole No. 2 is open without any coil being mounted thereon. Pole No. 3 has two trigger coils 30 and 32 mounted on it, the trigger coil 30 being used for starting, while the trigger coil 32 is used for normal running conditions for the engine. All three coils 28, 30 and 32 are used with the ignition circuits for the engine as will be further described hereinafter.

On poles Nos. 4–12, power coils 34 are mounted, which are connected in series to form an alternator of the conventional type which, when connected to the power circuits of the vehicle or the like on which the engine is mounted, may be used to charge batteries, operate lights etc. These circuits are well known and will not be described further. All of the coils mounted on poles Nos. 1–12 may be prewound on bobbins or otherwise and carefully insulated electrically from the stator member 20 as is conventional and well known in the art.

Exteriorly of the pole surfaces 26a, a rotor 36 is provided which cooperates by means of minimal air gap 38 with the poles ends to provide magnetic excitation of varying density to generate proportionate voltages in the various coils. For this purpose a rotor structure is provided which mounts up to give equally spaced magnet groups 40, with at least one magnet group being omitted and replaced with suitable counterweights 42 having no magnetic properties so that a balanced rotor is attained to be suitable for rotation at high speeds. The rotor 36 is suitably mounted in a conventional manner on the shaft 24 to rotate therewith so that the magnet groups 40 are driven past the stator poles Nos. 1–12 to magnetically excite the coils with a period of recovery when no magnetic excitation occurs by the passage of the non-magnetic counterweights 42 as will be described further hereinafter.

Figure 2:
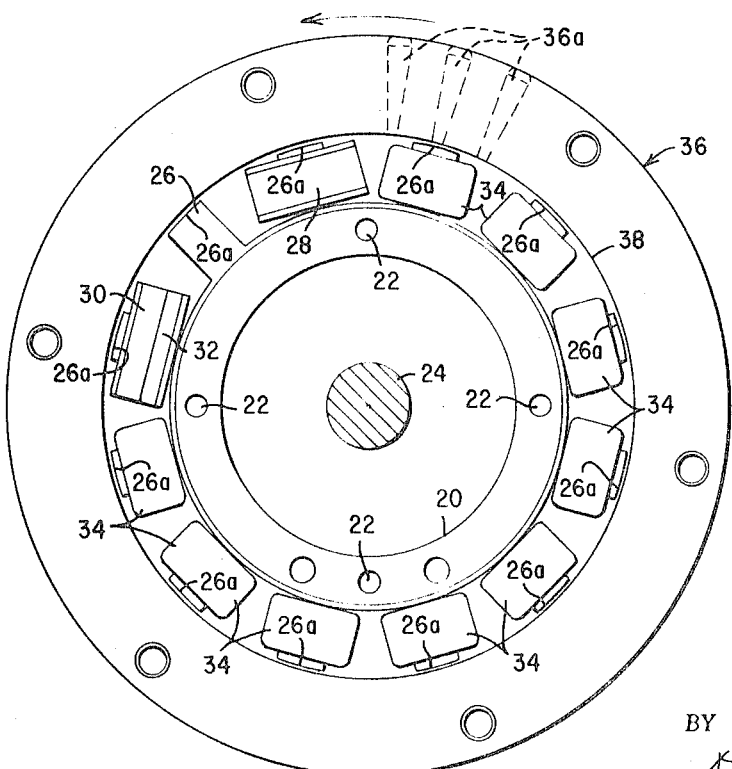
FIG. 2 is a bottom plan view of the same.

The lower side of the rotor is provided with flutes 36a, as seen in FIG. 2, which during rotation cause a flow of cooling air to pass through the stator 20 for reducing the operating temperatures under load. The magnet groups 40 consist of high coercive permanent magnets 40a cooperating with laminated magnetic shoes 40b at each end of the magnets 40a to provide magnetic north and south poles in closely juxtaposed relation in the air gap 38 to provide the magnetic excitation. All of the members of the rotor are held in fixed relation by the rotor structure. The pole shoes 40b extend into the inner circular opening 40c of the rotor concentric with the shaft 24 and also concentric with the outer end surfaces 26a of the poles 26 numbered 1–12 on the stator 20.

Figure 3:
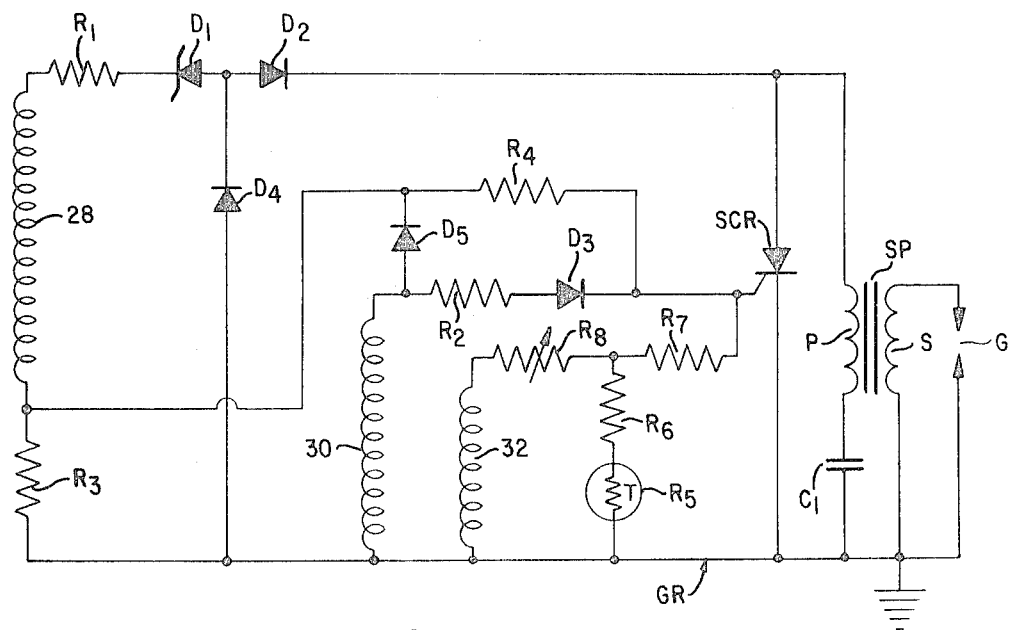
FIG. 3 is a schematic diagram of connections of the ignition system.

Referring now to FIG. 3 which is a schematic diagram of connections of the magneto when used in connection with a condenser discharge ignition circuit for a single cylinder engine, a charging condenser $C_1$ is shown in circuit with the primary P of a step-up transformer SP whose secondary S is connected to a spark gap or spark plug G to fire the explosive charge in the cylinder of the engine (not shown). One side of the condenser $C_1$ is connected to ground GR, while the opposite side is connected to the primary P through which the condenser $C_1$ may be charged by charging coil 28 acting through resistance $R_1$ and $R_3$ and diodes $D_1$ and $D_2$. An SCR is connected across the condenser $C_1$ and the primary P, being normally non-conductive to allow charging of the condenser $C_1$ by the coil 28. When however, a suitable positive potential is applied to the gate electrode of the SCR, it becomes conductive and allows the charged condenser $C_1$ to discharge through the primary P of the step-up transformer SP to induce a high voltage in the secondary S which fires the spark plug G and ignites the combustible charge in the cylinder of the engine. The charging coil 28 is grounded through resistance $R_3$ to complete the charging circuit for the condenser $C_1$.

In order to apply the suitable positive voltage pulse to the gate electrode of the SCR, trigger coils 30 and 32 (See FIG. 1 & 3) are provided, which are both connected to the gate electrode of the SCR and both have one side grounded as shown. The "start" trigger coil 30 has approximately five times the number of turns found in the "run" trigger coil 32, so that at low speeds of rotation of the rotor 36, the voltages generated in the two coils will be proportional and so designed that until a predetermined speed of rotation of the rotor 36 is reached, the voltage generated in the "run" trigger coil 32 is below (position 2-3 in FIG. 4) that voltage required to fire the SCR, while that generated in the "start" trigger coil 30 would be sufficiently high to fire the SCR but is not of the right polarity being negative rather than positive as required to fire SCR. This is clearly shown in FIG. 4. The firing voltage F for the SCR is shown in dotted line as a positive potential in the graphs for the "start" and "run" trigger coils. At the 1-2 position with the leading magnet group 40A having just passed the charge coil 28 on pole No. 1 in FIG. 1, the positive charge pulse A has been stored on the condenser $C_1$ as pointed out above which is now ready to energize the primary P of the step-up transformer SP before pole No. 1. The negative pulse N in the "start" trigger coil 30 is of the wrong polarity while the positive pulse B in the "run" trigger coil 32 is too low to reach the required triggering voltage F for the SCR with the result that the SCR does not fire and no spark occurs at the spark plug G.

Then, as the leading magnet group 40A in FIG. 1 approaches the 3-4 position by advancing another 30 mechanical degrees (equivalent to 180 electrical degrees) a positive pulse Q occurs in the "start" trigger coil 30 which is sufficiently high in voltage to fire the SCR which then becomes conductive and discharges the condenser $C_1$ through the primary P to induce a high voltage in the secondary which causes an ignition spark at the spark plug G. The pulse W generated simultaneously in the "run" trigger coil 32 is negative and therefore of the wrong polarity to fire the SCR.

Figure 4:
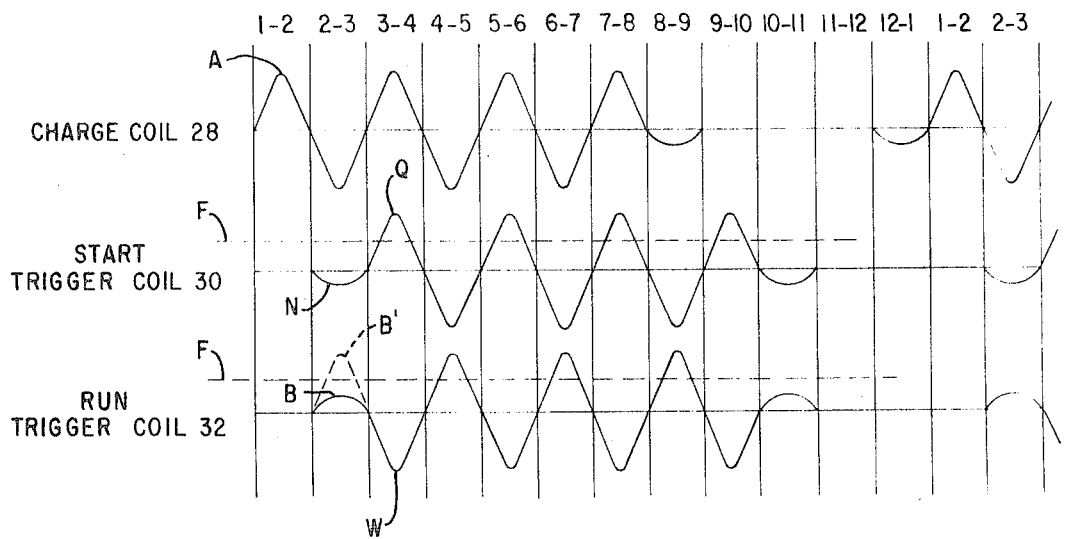
FIG. 4 is a graph showing the timing relations of the generated pulses of the coils cooperating with the ignition circuit.

As the speed of rotation of the rotor 36 increases, and approaches a predetermined speed, the voltage amplitude of the pulse B in the "run" trigger coil 32 increases until the voltage of the pulse B' is sufficient to fire the SCR, which occurs approximately 30° earlier, thereby advancing the spark at the spark plug G by this amount. This occurs at station 2-3 of the stator 20 which is the normal timing of the spark at the spark plug G for normal operation of the engine. Following this initial spark, the SCR will be held in conductive condition until 8-9 station is reached by the leading magnet group 40A, inasmuch as triggering pulses have been applied to the gate electrode of the SCR by both the "start" and "run" trigger coils 30 and 32 as is shown in FIG. 4. The charging pulses of the charging coil 28 are short-circuited by the conductive condition of the SCR, which pulses terminate at position 7-8 and none again occur until the new 1-2 position is reached by the leading magnet group 40A. This is due to the absence of any magnetic excitation by the non-magnetic counterweight 42 which spans at least 60 mechanical degrees of the rotor 36. This non-excitation for at least 60° of the rotor also affects the trigger coils 30 and 32 as is clearly shown in FIG. 4, where no pulse of any kind is generated in position 11-12 which is a recovery period for the ignition circuit, allowing all elements to become inactive, particularly the SCR which is returned non-conductive nonconductive state. This is assured by the resistor $R_3$ in conjunction with diode $D_5$ and resistor $R_4$ which provide a negative bias on the SCR prior to a new charge cycle. The diode $D_1$ which is a zener, prevents small charge pulses from charging the condenser $C_1$ which when discharged could cause "maverick" sparking. Resistor $R_1$ regulates the charging voltage to the condenser $C_1$ keeping it constant during normal operation, particularly when used with diode $D_4$. The combination obviates the need of a loading power zener diode.

The ignition circuit disclosed when operated as described, provides one spark per revolution, but with some modifications and selecting suitable locations of the exciting magnets and additional trigger coils, two or more sparks per revolution may be obtained. It is important that at least one recovery period be provided during a revolution in which no pulses are generated, either in the charging coil or in the trigger coils. Immediately following the recovery period, a new cycle will begin by charging the condenser $C_1$ with a new charging pulse by the coil 28 all as described above.

The "run" trigger coil 32 is connected to the gate electrode of the SCR through variable resistance $R_8$ and resistance $R_7$ with a third Resistance $R_6$ being connected to the junction of the first two resistances. A negative temperature resistor $R_5$ connects the other side of the resistor $R_6$ to ground, which gives an operator temperature compensation control over the firing times of the SCR by adjusting the variable resistance $R_8$. The resistors $R_8$, $R_6$ and $R_5$ form a voltage divider for controlling the voltage applied to the gate electrode of the SCR. By decreasing or increasing the value of the variable resistance $R_8$, the voltage applied from the "run" trigger coil 32 to the gate electrode of the SCR may be increased or decreased, respectively. Hence, varying the value of the resistor $R_8$ varies the speed of the engine at which a sufficient voltage is applied from the "run" trigger coil 32 to the gate electrode of the SCR for triggering the SCR. The resistor $R_5$ is a thermistor having a negative temperature coefficient. When the engine is heated during operation of the engine, the resistance of $R_5$ decreases to decrease the voltage applied from the "run" trigger coil 32 to the gate electrode of the SCR. The trigger coils 30 and 32 are both connected to the gate electrode of the SCR, generally in parallel with each other.

The following parameters for the ignition circuit shown in FIG. 3 have been found successful:

| | |
|---|---|
| Charging coil 28 | 5500 turns No. 40 wire |
| Start trigger coil 30 | 1500 turns No. 35 wire |
| Run trigger coil 32 | 300 turns No. 35 wire |
| Condenser $C_1$ | 0.68 microfarads |
| Resistor $R_1$ | 300 ohms 5 watt |
| Resistor $R_2$ | 33 ohms 3 watt |
| Resistor $R_3$ | 33 ohms ½ watt |
| Resistor $R_4$ | 6.8kΩ ¼ watt |
| Resistor $R_5$ | Negative temperature 2D104 |
| Resistor $R_6$ | 130 ohms ¼ watt |
| Resistor $R_7$ | 560 ohms ¼ watt |
| Resistor $R_8$ | Variable 2.2kΩ ½ watt |
| Diode $D_1$ | Zener 30 v. 2 watt |

It is understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. Electrical power producing apparatus for operating an internal combustion engine comprising, in combination, a step-up transformer for generating a high voltage for producing timed ignition sparks, a capacitor, electronic switch means having input, output and control terminals, means connecting said capacitor, the primary winding of said transformer and said input and output terminals of said switching means in a closed series circuit whereby said switching means when energized discharges energy stored in said capacitor through the primary winding of said transformer, an alternator including a stator having a plurality of spaced poles and a rotor having unequally spaced permanent magnet groups, means for rotating said rotor in synchronism with the engine, said magnet groups being located on said rotor to form changing magnetic circuits with said pole pieces as said rotor is rotated, said alternator having at least four windings for producing first, second, third and fourth voltages, means mounting said first winding on a first of said poles for periodically inducing a first voltage across said first winding, means for charging said capacitor with said first voltage, means mounting said second and third windings on a second of said poles for periodically generating alternating voltages out of phase with each other, means spacing said second pole from said first pole whereby said capacitor is charged prior to inducing voltages across said second and third windings, means mounting said fourth winding on at least one of the remaining poles for producing power for a power consuming circuit in the engine, and means applying at least a portion of the alternating voltages from said second and third windings to said control terminal for energizing said switch means during half cycles of one polarity when the voltage exceeds a predetermined level, said second winding periodically producing a first voltage of said one polarity exceeding said predetermined level when said rotor is rotated and said third winding periodically producing a second voltage of said one polarity advanced in phase from said first voltage and exceeding said predetermined level only when said rotor is rotated faster than a predetermined speed.

2. The apparatus of claim 1 which further includes means for selectively varying the predetermined speed at which said third winding will produce a voltage exceeding said predetermined level.

* * * * *